United States Patent [19]

Petersen et al.

[11] 4,106,589

[45] Aug. 15, 1978

[54] DEVICE ADAPTED TO BE FASTENED TO A WIRE, A CABLE, A CORD, OR A SIMILAR FLEXIBLE ELONGATED ELEMENT

[76] Inventors: Knud William Petersen; John Petersen, both of Rogle, Gronholt, 3480 Fredensborg, Denmark

[21] Appl. No.: 760,990

[22] Filed: Jan. 21, 1977

[30] Foreign Application Priority Data

Jan. 23, 1976 [DK] Denmark .............................. 280/76

[51] Int. Cl.² .............................................. A62B 1/14
[52] U.S. Cl. ....................................................... 182/5
[58] Field of Search .................. 182/5, 6, 7; 188/65.5, 188/65.4, 65.2, 65.1

[56] References Cited

U.S. PATENT DOCUMENTS

| 263,100 | 8/1882 | Beebe | 188/65.5 |
| 272,129 | 2/1883 | Edmonds | 182/7 |
| 641,809 | 1/1900 | Tillottson | 188/65.5 |

*Primary Examiner*—Reinaldo P. Machado
*Attorney, Agent, or Firm*—Fleit & Jacobson

[57] ABSTRACT

A device adapted to be fastened to a wire, a cable, a cord, or a similar flexible elongated element. The device comprises a base member or plate on which a preferably cylindrical element engaging member is mounted so as to be rotatable in one direction, and means, such as a ratchet mechanism, are provided for preventing rotational return movement of said engaging member. A transversely extending channel or slot in which part of said elongated element may be inserted, is defined in one end surface of the element engaging member, and when rotated in said one direction the wire or elongated element is wound around the cylindrical engaging member.

9 Claims, 4 Drawing Figures

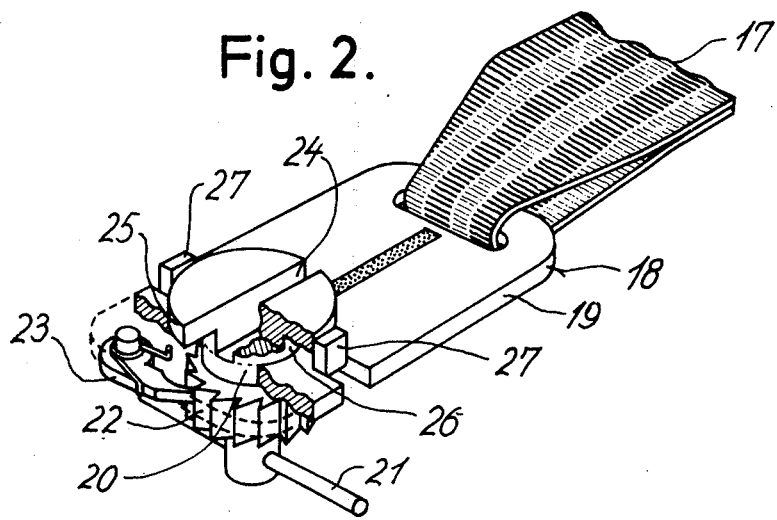
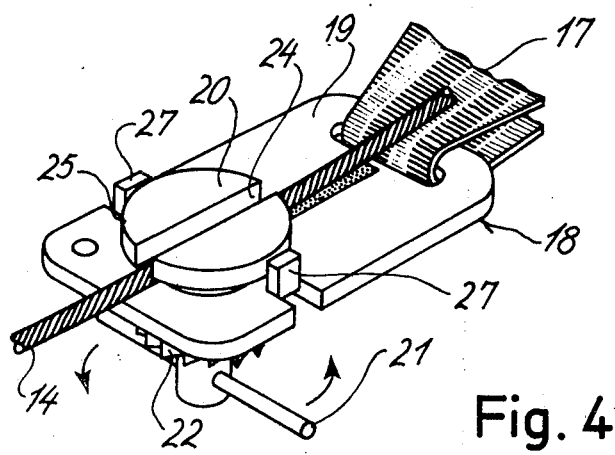
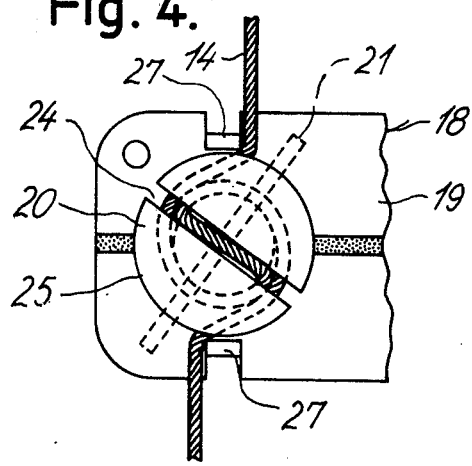

DEVICE ADAPTED TO BE FASTENED TO A WIRE, A CABLE, A CORD, OR A SIMILAR FLEXIBLE ELONGATED ELEMENT

BACKGROUND OF THE INVENTION

1. Field of the Invention

In many situations there is a need for quick and effective fastening of an object of some kind to a wire, a cable, a cord or a similar flexible elongated element at an arbitrarily selected position along its length. As an example, in rescue operations it may be desired to fasten a rescue belt or harness to a cable or cord in order to be able to lower or hoist persons or goods. The present invention relates to a device adapted to be fastened to such flexible elongated element.

2. Description of the Prior Art

U.S. Pat. No. 2,914,139 discloses a cable connector substantially consisting of a pair of pivotally connected, separable plates of spring steel. This known connector may be placed around a cable and clamped thereto when a force is applied to the connector. However, this known connector is not suited for use in emergency situations because it is relatively difficult to place around a cable, and it may also be a substantial disadvantage that the clamping effect is conditioned on application of a pulling force and that the fastening is exclusively based on frictional forces.

SUMMARY OF THE INVENTION

The present invention provides a device which may quickly and reliably be fastened to a wire, a cable, a cord or a similar flexible, elongated element at any selected position along its length. The device according to the invention comprises a base member, an element engaging member mounted on said base member so as to be rotatable about an axis in at least one direction in relation to the base member, and means for preventing rotational return movement of the engaging member, said engaging member defining at one end an open channel or slot extending transversely to said axis and being adapted to receive part of said elongated element, whereby when inserted in said channel, the elongated element may be wound around the element engaging member by rotating the same in said one direction. When the device according to the invention is to be fastened to a wire or a similar flexible, elongated element this element is merely inserted into the transversely extending channel or slot whereafter the engaging member is rotated in said one direction. The wire or elongated element will then be wound around the engaging member and consequently fastened thereto.

The device according to the invention is preferably formed so as to effectively prevent that the part of the elongated element wound around the engaging member may be removed therefrom when a pulling force is applied to the connection established between the elongated element and the said device. This may, for example, be obtained by using an engaging member having a maximum radial width increasing toward the end defining the transversely extending channel or slot. A more safe and reliable securing of the length of the elongated element wound around the engaging member may, however, be obtained when the element engaging member comprises one or more radially outwardly extending parts positioned between said one end of the engaging member and the location at which the elongated element is wound therearound. As an example, the element engaging member may be shaped substantially as a fork having prongs defining therebetween a channel or groove for receiving the flexible elongated element. In order to prevent that the length of a flexible elongated element which has been wound around the fork-shaped member by rotation of the same may be again be pulled therefrom the prongs of the fork-shaped member may adjacent to their free ends have radially extending parts. However, in a preferred embodiment of the device according to the invention the element engaging member is shaped as a substantially cylindrical body defining a circumferential channel or groove for receiving the part of the elongated element being wound around said body. Furthermore, the said base member may comprise parts partly covering the circumferential channel or groove. By such a structure it may be almost impossible to release the device according to the invention from a wire or another flexible elongated element to which it has been fastened.

The means for preventing rotational return movement of the engaging member may be manually operateable locking means which are manually actuated so as to lock the engaging member when a length of the flexible elongated element has been wound therearound. However, the best security against erroneous operation is obtained when the said means are adapted to automatically prevent any rotational return movement, and these means may then comprise a ratchet mechanism.

BRIEF DESCRIPTION OF THE DRAWING

The invention will now be further explained with reference to the drawings, wherein FIG. 2 shows a perspective view of an embodiment of a device according to the invention, certain parts having been removed, FIG. 3 shows the device of FIG. 2 into which a wire or cable has been inserted, and FIG. 4 shows a plan view of a part of the device shown in FIGS. 2 and 3 after fastening of the device to the wire or cable.

DESCRIPTION OF THE PREFERRED EMBODIMENT

Figure 1:
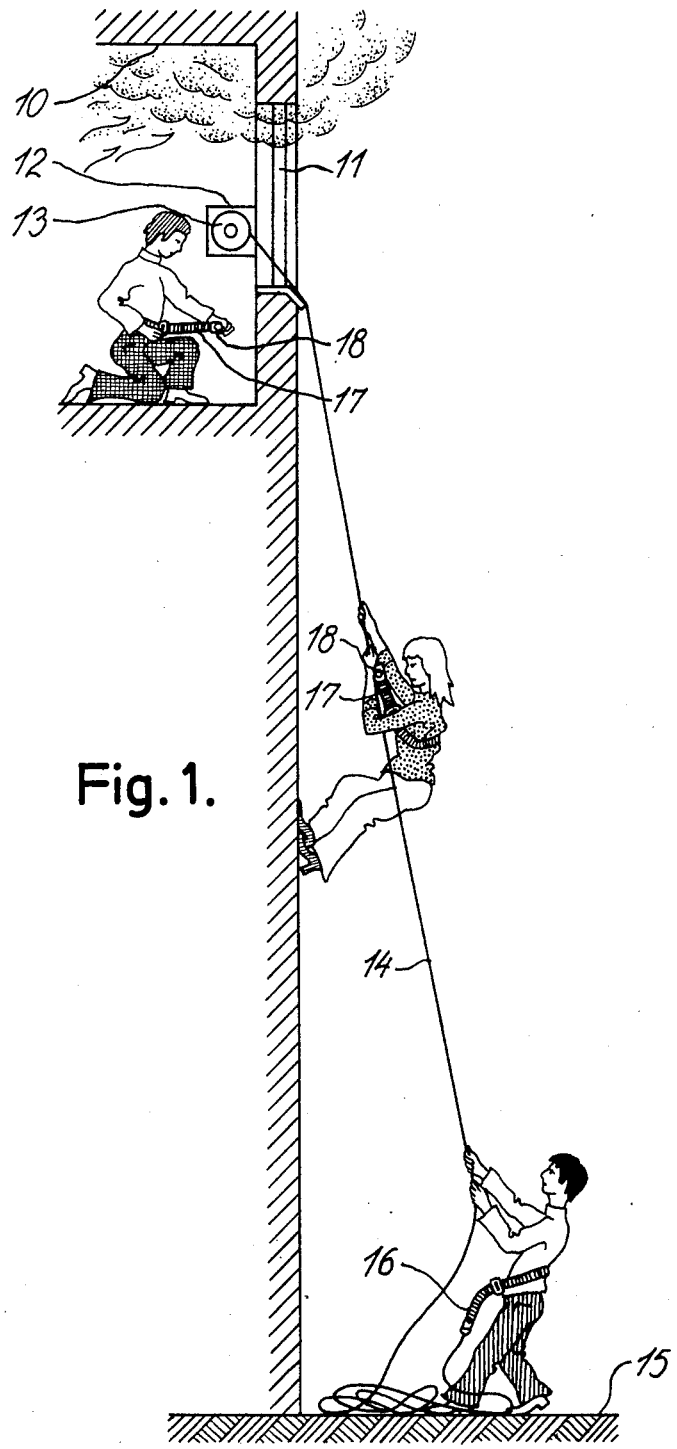
FIG. 1 shows a situation where persons are lowered in a wire or cable by means of a fire escape apparatus.

FIG. 1 shows an apartment house including a room 10. On the outer wall of this room adjacent to the window opening 11 a fire escape apparatus 12 having a drum or coil 13 and a mechanism (not shown) for automatically controlling the speed thereof, is mounted. A wire, a cable, a cord or a similar flexible elongated element 14 is wound around the drum 13. The cable 14 preferably has a length of several hundred meters, for example 300 meters. A rescue harness or belt 16 is permanently fastened to the free end of the cable 14, and when the fire escape apparatus 12 is not in use the wire or cable 14 is wound around the drum 13. A number of additional harnesses or belts 17 also belongs to the escape apparatus 12 and each of these harnesses or belts is provided with a fastening device 18 which will be described more in detail below. By means of these fastening devices the belts or harnesses 17 may quickly and simply be fastened to the wire or cable 14 at any positioned along its length.

In an emergency situation, for example a fire at the staircase, making it possible to escape only through the window opening 11 the persons present in the room 10 may be lowered to the ground 15 by means of the escape apparatus 12. The first person may use the belt 16 permanently fastened to the wire or cable 14, and each of the other persons in the room may put on one of the additional belts or harnesses 17 belonging to the apparatus 12. Thereafter they may successively fasten the belt to the wire or cable 14 by means of the fastening device 18 and be lowered to the ground as illustrated in FIG. 1.

FIGS. 2 - 4 show the fastening device 18 which may be used for fastening the belts or harnesses 17 to the wire or cable 14. The device 18 comprises a base plate 19 to which the belt or harness is fastened in any suitable manner. A substantially cylindrical wire engaging member 20 is mounted in the base plate 19 so as to be rotatable around an axis substantially vertical to the base plate by means of a handle 21. A ratchet mechanism including a ratchet wheel 22 fastened to the engaging member 20 and a cooperating spring biased pawl 23 allows rotation of the engaging member 20 only in one direction and prevents rotation in the opposite direction. In the end of the engaging member 20 opposite to said handle 21 a substantially diametrically extending channel or slot 24 is formed, and together with the base plate 19 a radially extending flange 25 formed at the end of the engagement member 20 defines a circumferential channel 26. A pair of tabs 27 extends from the base plate 19 and covers part of the circumferential channel.

When the fastening device 18 is to be fastened to a wire or cable 14 the device is placed so in relation to the wire that part thereof is received in the diametrically extending channel or slot 24 as shown in FIG. 3. Thereafter, the user turns or rotates the handle 21 in the direction indicated by arrows in FIG. 3, and thereby an intermediate length of the wire is wound around the engaging member 20 and received in the circumferential groove 26. From FIG. 4 it appears that an effective interconnection of the wire 14 and the fastening device 18 is obtained provided that the engaging member 20 is rotated an angle of more than 90°. In that case the tabs 27 as well as the ratchet wheel 22 and the pawl 23 will prevent the wire 14 from being pulled free of the engaging member 20.

It should be understood that several modifications and changes of the embodiment described above may be made within the scope of the present invention. Furthermore, it should be understood that use of the fastening device according to the invention is not restricted to rescue operations only, but the fastening device may be used in any case in which it is desired to establish a connection with a wire or cable or a similar flexible, elongated element at a selected position along its length. The device described could, however, also be used in cases where it is desired to tighten an extended wire, cord, or similar flexible elongated element.

We claim:

1. A device adapted to be fastened to a wire, a cable, or cord or a similar flexible elongated element, said device comprising a base member, an element engaging member mounted on said base member so as to be rotatable about an axis in at least one direction in relation to the base member, and means for preventing rotational return movement of the element engaging member, said element engaging member defining at one end an open channel or slot extending transversely to said axis and being adapted to receive part of said elongated element, whereby, when inserted in said channel, the elongated element may be wound around a portion of the element engaging member located between said one end and said base member by rotating the same in said one direction, said element engaging member comprising one or more radially outwardly extending parts positioned between said one end and said portion of the element engaging member.

2. A device according to claim 1, wherein the element engaging member is shaped as a substantially cylindrical body defining a circumferential channel or groove for receiving the part of the elongated element being wound around said body.

3. A device according to claim 2, wherein said base member comprises parts partly covering the circumferential channel or groove.

4. A device according to claim 3, wherein said transversely extending channel or groove is substantially diametrical.

5. A device according to claim 1, wherein said means for preventing rotational return movement of the engaging member comprise a ratchet mechanism.

6. A device adapted to be fastened to a wire, a cable, a cord, or a similar flexible elongated element, said device comprising
   a plate member,
   a substantially cylindrical element engaging member mounted on said plate member so as to be rotatable about its axis which extends substantially vertical to said plate member, one end portion of said element engaging member having a peripheral flange axially spaced from said plate member, said end portion being bifurcated and defines therein a channel or slot extending axially inwardly beyond said flange, and
   means allowing rotation of said engaging member in one direction and preventing rotation in the opposite direction.

7. A device according to claim 6, wherein part of the base plate extends from a position radially spaced from the element engaging member to a position adjacent to the periphery of said flange.

8. A device according to claim 7, wherein said allowing and preventing means comprise a ratchet mechanism.

9. A device according to claim 8, wherein said channel or slot extends diametrically.

* * * * *